(12) United States Patent
Schroers et al.

(10) Patent No.: US 10,972,749 B2
(45) Date of Patent: Apr. 6, 2021

(54) SYSTEMS AND METHODS FOR RECONSTRUCTING FRAMES

(71) Applicant: Disney Enterprises, Inc., Burbank, CA (US)

(72) Inventors: Christopher Schroers, Zurich (CH); Joaquim Campos, Lausanne (CH); Abdelaziz Djelouah, Zurich (CH); Yuanyi Xue, Kensington, CA (US); Erika Varis Doggett, Los Angeles, CA (US); Jared McPhillen, Glendale, CA (US); Scott Labrozzi, Cary, NC (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/556,083

(22) Filed: Aug. 29, 2019

(65) Prior Publication Data
US 2021/0067801 A1 Mar. 4, 2021

(51) Int. Cl.
*G11B 27/036* (2006.01)
*G06T 3/00* (2006.01)
(Continued)

(52) U.S. Cl.
CPC ......... *H04N 19/573* (2014.11); *G06K 9/6256* (2013.01); *G06T 7/254* (2017.01); *H04N 19/172* (2014.11); *H04N 19/182* (2014.11)

(58) Field of Classification Search
CPC .. H04N 19/573; H04N 19/172; H04N 19/182; G06T 7/254; G06K 9/6256
See application file for complete search history.

(56) References Cited

U.S. PATENT DOCUMENTS

2003/0206583 A1* 11/2003 Srinivasan ............ H04N 19/53
375/240.01
2004/0264568 A1* 12/2004 Florencio ............. H04N 19/63
375/240.12

(Continued)

FOREIGN PATENT DOCUMENTS

EP 3451670 A1 3/2019

OTHER PUBLICATIONS

"End-to-End Learning of Video Compression Using Spatio—Temporal Autoencoders" ICLR, 2019, <https://openreview.net/pdf?id=HyllasActm>.

(Continued)

*Primary Examiner* — Joon Kwon
(74) *Attorney, Agent, or Firm* — Artegis Law Group, LLP

(57) ABSTRACT

Systems and methods are disclosed for reconstructing a frame. A computer-implemented method may use a computer system that includes non-transient electronic storage, a graphical user interface, and one or more physical computer processors. The computer-implemented method may include: obtaining one or more reference frames from non-transient electronic storage, generating one or more displacement maps based on the one or more reference frames and a target frame with the physical computer processor, generating one or more warped frames based on the one or more reference frames and the one or more displacement maps with the physical computer processor, obtaining a conditioned reconstruction model from the non-transient electronic storage, and generating one or more blending coefficients and one or more reconstructed displacement maps by applying the one or more displacement maps, the one or more warped frames, and a target frame to the conditioned reconstruction model with the physical computer processor.

20 Claims, 7 Drawing Sheets

(51) Int. Cl.
  *G06T 7/246* (2017.01)
  *H04N 19/573* (2014.01)
  *G06K 9/62* (2006.01)
  *H04N 19/182* (2014.01)
  *H04N 19/172* (2014.01)
  *G06T 7/254* (2017.01)

(56) References Cited

U.S. PATENT DOCUMENTS

| | | |
|---|---|---|
| 2011/0249747 A1 | 10/2011 | Endo |
| 2011/0280308 A1 | 11/2011 | Oishi et al. |
| 2012/0189058 A1 | 7/2012 | Chen et al. |
| 2015/0350509 A1* | 12/2015 | Tico ............... H04N 5/2355 348/362 |
| 2016/0350893 A1* | 12/2016 | Fletcher ............ G06T 3/0081 |
| 2017/0154234 A1 | 6/2017 | Tanaka et al. |
| 2017/0230675 A1 | 8/2017 | Wierstra |
| 2017/0237993 A1 | 8/2017 | Kim et al. |
| 2017/0374374 A1* | 12/2017 | Wang ............... H04N 19/154 |
| 2018/0014022 A1 | 1/2018 | Cho et al. |
| 2019/0026631 A1 | 1/2019 | Carr |
| 2019/0066733 A1* | 2/2019 | Somanath ............. G06T 7/246 |
| 2019/0373264 A1 | 12/2019 | Chong et al. |
| 2020/0244969 A1 | 7/2020 | Bhorkar |

OTHER PUBLICATIONS

Chen et al., "DeepCoder: A Deep Neural Network based Video Compression," School of Electronic Science and Engineering, Nanjing University, Jiangsu, China, Dec. 2017, <https://www.researchgate.net/publication/323501194_DeepCoder_A_deep_neural_network_based_video_compression>.

Lu et al., "DVC: An End-to-end Deep Video Compression Framework," Shanghai Jiao Tong University; The University of Sydney; The University of Sydney, Sense Time Computer Vision Research Group, Dec. 14, 2018, <https://arxiv.org/pdf/1812.00101.pdf>.

Kin et al., "Video Compression Using Recurrent Convolutional Neural Networks," Electrical Engineering Computer Science, 2017, <http://cs231n.stanford.edu/reports/2017/pdfs/423.pdf>.

Despois, "Latent space visualization—Deep Learning bits," Deep Learning Engineer @ L'Oréal, Feb. 24, 2017, <https://hackernoon.com/latent-space-visualization-deep-learning-bits-2-bd09a46920df>.

Notice of Allowance received for U.S. Appl. No. 16/557,920, dated Jan. 19, 2021, 21 pages.

* cited by examiner

SYSTEMS AND METHODS FOR RECONSTRUCTING FRAMES

TECHNICAL FIELD

The present disclosure relates generally to encoders and decoders.

BRIEF SUMMARY OF THE DISCLOSURE

Embodiments of the disclosure are directed to systems and methods for reconstructing a frame. In one embodiment, a computer-implemented method may include obtaining one or more reference frames from non-transient electronic storage. The computer-implemented method may include generating, with an optical flow model, one or more displacement maps based on the one or more reference frames and a target frame with the physical computer processor. The computer-implemented method may also include obtaining a conditioned reconstruction model from the non-transient electronic storage. The conditioned reconstruction model is conditioned by training an initial reconstruction model using training content. The training content may include a training target frame and one or more training reference frames. The computer-implemented method may further include generating one or more blending coefficients and one or more reconstructed displacement maps by applying the one or more displacement maps, the one or more warped frames, and a target frame to the conditioned reconstruction model with the physical computer processor.

In embodiments, the computer-implemented method may include obtaining one or more reconstructed reference frames from the non-transient electronic storage. The computer-implemented method may also include generating a reconstructed target frame using the one or more reconstructed reference frames, the one or more blending coefficients, and the one or more reconstructed displacement maps with the physical computer processor.

In embodiments, individual ones of the blending coefficients may indicate which pixels to use from individual ones of the one or more reconstructed reference frames.

In embodiments, individual ones of the one or more reference frames may be reconstructed target frames.

In embodiments, individual ones of the one or more reference frames may be separated from the target frame by an interval.

In embodiments, the interval may be between about one frame and about five frames.

In embodiments, individual ones of the one or more displacement maps may represent motion data based on differences between the target frame and individual ones of the one or more reference frames.

In embodiments, individual ones of the one or more warped frames may be generated by applying individual ones of the one or more displacement maps to individual ones of the one or more reference frames.

In another embodiment, a computer-implemented method is disclosed. The computer-implemented method may include obtaining an initial reconstruction model from non-transient electronic storage. The computer-implemented method may also include obtaining training content from the non-transient electronic storage. The training content includes a training target frame and one or more training reference frames. The training target frame and the one or more training reference frames may be used to generate one or more corresponding training displacement maps and one or more corresponding training warped frames. The computer-implemented method may further include generating a conditioned reconstruction model from the non-transient electronic storage by training the initial reconstruction model using training content with the physical computer processor.

In embodiments, the computer-implemented method may include obtaining one or more reference frames from the non-transient electronic storage. The computer-implemented method may also include generating, with an optical flow model, one or more displacement maps based on the one or more reference frames and a target frame with the physical computer processor. The computer-implemented method may further include generating one or more warped frames based on the one or more reference frames and the one or more displacement maps with the physical computer processor. The computer-implemented method may further include generating one or more blending coefficients and one or more reconstructed displacement maps by applying the one or more displacement maps, the one or more warped frames, and a target frame to the conditioned reconstruction model with the physical computer processor.

In embodiments, the computer-implemented method may include obtaining one or more reconstructed reference frames from the non-transient electronic storage. The computer-implemented method may also include generating a reconstructed target frame using the one or more reconstructed reference frames, the one or more blending coefficients, and the one or more reconstructed displacement maps with the physical computer processor.

In embodiments, individual ones of the blending coefficients may indicate which pixels to use from individual ones of the one or more reconstructed reference frames.

In embodiments, individual ones of the one or more displacement maps may represent motion data based on differences between the target frame and individual ones of the one or more reference frames.

In another embodiment, a system for reconstructing a frame is disclosed. The system may include a non-transient electronic storage. The system may also include a physical computer processor configured by machine-readable instructions to perform a number of operations. One operation may include obtaining target content. Another operation may include obtaining a conditioned reconstruction model. The conditioned reconstruction model is conditioned by training an initial reconstruction model using training content, the training content comprising a training target frame and one or more target reference frames. Yet another operation may include generating one or more blending coefficients and one or more reconstructed displacement maps by applying the target content to the conditioned reconstruction model.

In embodiments, the physical computer processor may be further configured by machine-readable instructions to perform a number of operations. One operation may include obtaining one or more reconstructed reference frames. Another operation may include generating a reconstructed target frame using the one or more reconstructed reference frames, the one or more blending coefficients, and the one or more reconstructed displacement maps.

In embodiments, individual ones of the blending coefficients may indicate which pixels to use from individual ones of the one or more reconstructed reference frames.

In embodiments, the target content may include a target frame, one or more displacement maps, and one or more corresponding warped frames.

In embodiments, individual ones of the one or more displacement maps may represent motion data based on differences between the target frame and one or more reference frames.

In embodiments, one or more reference frames may be separated by the target frame by one or more intervals.

In embodiments, the one or more corresponding warped frames may be generated by applying individual ones of the one or more displacement maps to the target frame.

Other features and aspects of the disclosed technology will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

Further aspects of the present disclosure will be more readily appreciated upon review of the detailed description of the various disclosed embodiments, described below, when taken in conjunction with the accompanying figures.

The figures are described in greater detail in the description and examples below are provided for purposes of illustration only, and merely depict typical or example embodiments of the disclosure. The figures are not intended to be exhaustive or to limit the disclosure to the precise form disclosed. It should also be understood that the disclosure may be practiced with modification or alteration, and that the disclosure may be limited only by the claims and the equivalents thereof.

DETAILED DESCRIPTION

Various embodiments of the present disclosure are directed to systems and methods for reconstructing a frame. Frames surrounding a target frame and the target frame itself may be used to reconstruct the target frame. In embodiments, corresponding motion data between reference frames and the target frame may be generated and used to warp the reference frames. The warped reference frames, the target frame, and the corresponding motion data may be applied to a conditioned model that generates reconstructed motion data and blending coefficients. The blending coefficients may be weights applied to a warped reconstructed reference frame to identify which pixels to include or remove based on the reconstructed target frame. The weighted warped reconstructed reference frames may be combined based on the blending coefficients, to generate, or estimate, a reconstructed target frame.

As used herein, a frame may be a frame of a video sequence or other visual content. As used herein, a target frame may be a frame that is to be reconstructed. As used herein, a reference frame may be an adjacent frame or a frame nearby the target frame. As used herein, reconstruction may refer to assembling, piecing together, estimating, predicting, or otherwise generating a frame based on encoded data. As used herein, a displacement map may refer to extracted motion data between frames (e.g., a direction one or more objects move between frames and/or how much the one or more objects move between frames). As used herein, a warped frame may refer to distorting, shifting, rotating, scaling, or otherwise changing a frame based on additional data (e.g., applying a displacement map to a frame to shift an image based on the displacement map). As used herein, a blending coefficient may refer to a weight or value by which a warped frame is multiplied (e.g., which pixels are relevant to reconstruct a target frame). As used herein, a reconstructed displacement map may refer to a decoded displacement map or a displacement map that is otherwise reconstructed using the methods described herein. As used herein, a reconstructed reference frame may refer to a decoded reference frame or a reference frame that is otherwise reconstructed using the methods described herein. As used herein, a reconstructed target frame may refer to a target frame that is reconstructed using the methods described herein.

Figure 1:
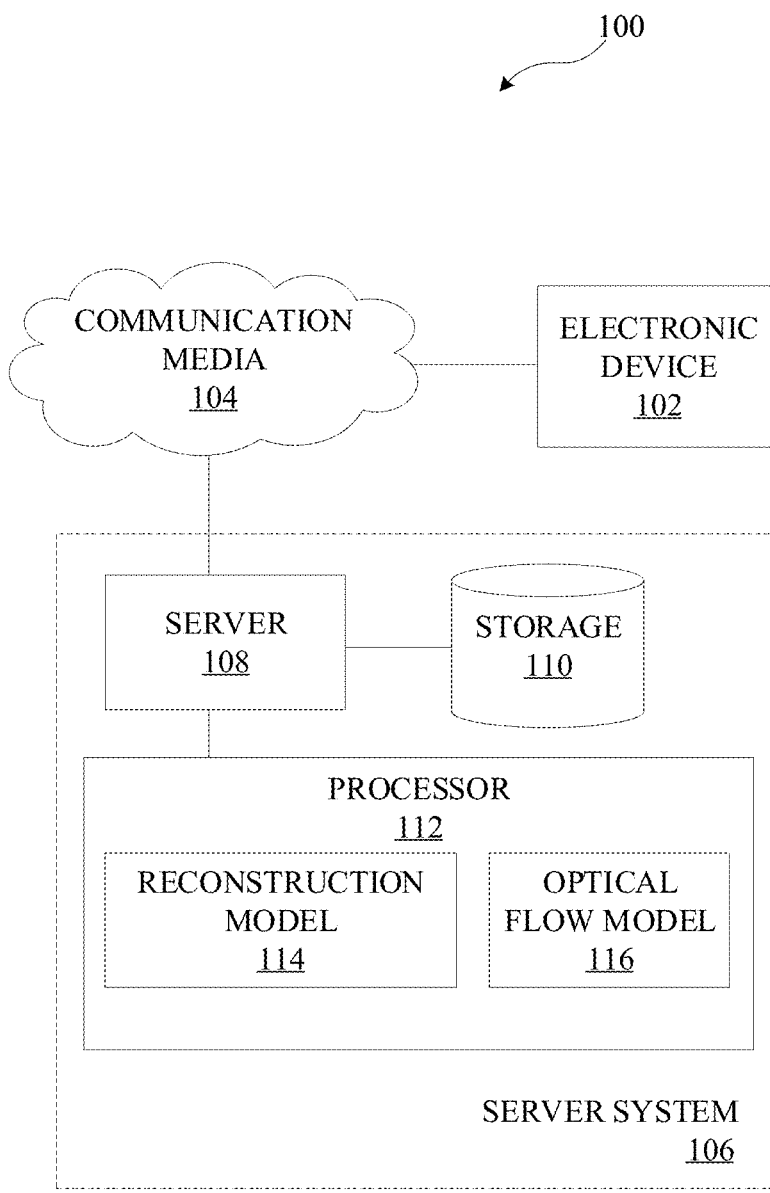
FIG. 1 illustrates an example system for reconstructing a frame, in accordance with various embodiments.

Before describing the technology in detail, an example environment in which the presently disclosed technology can be implemented will be described. FIG. 1 illustrates one such example environment 100.

Environment 100 may be used in connection with implementing embodiments of the disclosed systems, methods, and devices. By way of example, the various below-described components of FIG. 1 may be used to generate a reconstructed target frame. The reconstructed target frame may be generated using one or more frames of target content. Content may include different types of media content, such as, for example, videos, images, and/or other visual content. Content may come in various resolutions, such as standard, high definition (HD), ultra HD (UHD), 4 k UHD, 8 k UHD, and/or other resolutions. In some embodiments, the target content may be divided into multiple segments. The first and last frames of the segment may be encoded and decoded as independent frames, which may correspond to key frames. A reference frame may include a key frame. The target content may include a target frame, one or more reference frames, one or more displacement maps, and/or one or more warped frames. In embodiments, when there are multiple reference frames, the target frame may be between at least two of the multiple reference frames. The one or more reference frames may be used to generate one or more displacement maps and one or more corresponding warped frames. The target frame, the one or more warped frames, the one or more displacement maps, and the one or more reference frames may be used to generate one or more blending coefficients and one or more reconstructed displacement maps. The one or more blending coefficients and the one or more reconstructed displacement maps may be used to reconstruct the target frame. Reconstructed reference frames may also be used to help reconstruct the target frame. Server system 106 may include reconstruction model 114 and optical flow model 116, as will be described herein. Reconstruction model 114 may map encode, quantize, and/or decode content. Reconstruction model 114 and/or optical flow model 116 may use machine learning, such as, for example, neural networks.

Reconstruction model 114 may initially be untrained. Reconstruction model 114 may take one or more displacement maps, one or more corresponding warped frames, and a target frame as input and may output one or more blending coefficients and one or more reconstructed displacement maps. The one or more displacement maps may include motion data indicating how a second frame moves from a first frame, or vice versa. Displacement maps may be based on block-based methods, discrete optimization methods, differential methods, machine learned methods, and/or other techniques. For example, U.S. application Ser. No. 16/261,441, which is hereby incorporated by reference in its entirety, discloses a neural-network-based method to generate optical flow maps, or displacement maps. The one or more warped frames may be applying a displacement map to a corresponding reference frame. For example, a displacement map may be generated between a first frame and a second frame. By applying the displacement map to the first frame, a warped first frame may be generated that is an approximation of the second frame. The one or more blending coefficients may indicate which pixels to use from a reconstructed warped frame. For example, a reconstructed displacement map may be applied to a first reconstructed reference frame to generate a warped reconstructed reference frame. A blending coefficient may indicate how to weight each portion of the reconstructed warped frame based on commonalities and/or missing portions. For example, a warped reconstructed reference frame may not be able to account for a new object that should be in the reconstructed target frame (i.e., an object that is occluded in the first reconstructed reference frame), and the occluded portion may be blank. A blending coefficient might weight those values as zero, to minimize the processing accomplished on those portions. On the other hand, portions that are common between the warped reconstructed reference frame and the reconstructed target frame might be weighted at a full value. In embodiments, multiple blending coefficients may be dependent on each other. For example, if there are two warped reconstructed frames and two corresponding blending coefficients for a given pixel, a second blending coefficient value may be one minus the first blending coefficient value. It should be appreciated that the blending coefficient may be a step function that effectively multiplies individual pixels by 0 or 1, based on the importance of the pixel, or it may be a continuous function that effectively multiplies individual pixels between 0 and 1.

An initial reconstruction model may be trained using training content. The training content may include multiple frames from content. For example, the training content may be multiple frames from a video. The multiple frames may be adjacent to each other, such that a first frame immediately follows a second frame, and a third frame immediately follows a second frame, and so on. In some embodiments, the multiple frames may be separated by an interval that includes one or more frames. In embodiments, individual frames may be separated by a different number of frames (e.g., a first frame and a second frame may be separated by three frames, the second frame and a third frame may be separated by two frames, and the third frame and a fourth frame may be separated by three frames). In some embodiments, the interval between individual frames may be up to five frames. It should be appreciated that different intervals may be used depending on the length of a scene with similar objects. The multiple frames may correspond to a common scene. For example, if a video includes a jungle scene and an office scene, the training content may be grouped so that frames corresponding to the jungle are in a first group and frames corresponding to the office are in a second group.

The initial reconstruction model may be trained based on one or more reconstruction parameters. The one or more reconstruction parameters may include image distortion, rate-distortion, size of compressed data, processing power, quality level, efficiency, etc., as will be described herein. A trained initial reconstruction model may be a conditioned reconstruction model. The conditioned reconstruction model may output more meaningful blending coefficients (i.e., more accurately identifying common pixels and how to weight them) and reconstructed displacement maps (i.e., more accurately identifying motion data) than an initial recon model.

In one example, training content may include a septuplets data set. A random sample of triplets may be selected with various intervals of one, two, or three frames between the three images. The mean squared error may be used as image distortion loss d, as used in the equation below. Different rate-distortion ratios may be achieved by training with different weights $\lambda_{recon}$. In embodiments, independent uniform noise may be added to approximate quantization performed after encoding target content. For example, the independent uniform noise may be added to latent space values during training. The encoder-decoder may be trained based on the one or more reconstruction parameters. For example, the encoder and decoder may optimize rate-distortion while balancing competing interests of minimizing storage of latent representations:

$$\bigwedge\nolimits_{recon}^{*} = \operatorname*{argmin}_{\bigwedge_{recon}} \mathbb{E}_{x \sim p_X} [-\log_2 p_{\hat{q}}(\hat{q}) + \lambda_{recon} d(x, x_{recon})]$$

where $\bigwedge_{recon} = \{\rho, \rho', p_{\hat{q}}\}$, which may represent the learned parameters and $-\log_2 p_{\hat{q}}(\hat{q}) + \lambda_{recon} d(x_1, x_{recon})$ may correspond to the rate-distortion objective function.

In one example, a reconstruction parameter for a fixed target quality may achieve the lowest bit-rate for reconstructed target frames, while having a perceptually similar quality as the key frames. The quality may be determined by training reconstruction model 114 for a particular value of $\lambda_{recon}$ in the loss function above with $\bigwedge$. in some embodiments, the degree of freedom may come from selecting $\lambda_{recon}$ for reconstruction model 114. On the opposite end, choosing a higher quality for the interpolation may not be ideal either, as large motion can be present, such that interpolation may be difficult. One strategy may include comparing multiple, different interpolation configurations at test time and using one of the multiple, different interpolation configurations that results in the lowest total bitrate.

Reconstruction model 114 may include an encoder and a decoder (e.g., encoder-decoder pair ($h_\rho$, $h_\rho'$)). The encoder may predict, transform, and/or encode target frames. The encoder may predict pixels based on previously-encoded pixels in a frame (e.g., intra prediction) or on previously-encoded frames (e.g., inter prediction). The encoder may include a machine-learning-based encoder (e.g., a neural-network-based encoder), a block-based encoder, and/or other encoders. The encoder may include one or more convolutional layers, one or more quantization layers, one or more normalization layers, one or more activation functions, one or more latent spaces, one or more lossless encoders, and/or other components. A latent representation, q, of an image may be $$q = h_\rho(x, x_i, f_i)$$

where x may represent a target frame, $x_i$ may represent the one or more reference frames, and $f_i$ may represent the one or more displacement maps. A latent representation may be compressed versions of relevant input data (i.e., the encoder is trained to extract the most relevant features of the input so that the decoder can reconstruct the input as accurately as possible, limited by one or more parameters). The corresponding latent space may be where the latent representations reside or are generated and/or stored. The latent representation, q, may be quantized. Quantization may round or otherwise limit the values of any data into a smaller subset of values. For example, the values representing a latent space representation may be converted into a smaller set of discrete values. In embodiments, this may be accomplished by rounding the values according to a discrete finite set of values (e.g., integer values). In some embodiments, quantization may include dividing each value by an integer value. Quantized latent representation may be losslessly encoded. The one or more lossless decoders may include an entropy encoder. The entropy coder may losslessly compress quantized latent values into a compact bit stream. The entropy coding may be based on one or more probability models. For example, the probability model may include a non-parametric fully factorized model and/or more complex models. Though not illustrated, it should be appreciated that communication media may be implemented in reconstruction model 114 to transmit content from/to the encoder to/from the decoder. As an example, the encoder may include five blocks. Each block may include a convolutional layer and a Generalized Normalization Transformation (GDN) layer. The convolutional layers may have a kernel size, k, of about 5 and a stride, s, of about 2.

The decoder may decode, inverse transform, and/or reconstruct the target content. The decoder may include a machine-learning-based decoder (e.g., a neural-network-based decoder), a block-based decoder, and/or other decoders. The decoder may include one or more lossless decoders, one or more deconvolutional layers, one or more inverse normalization layers, one or more image spaces, and/or other components. The quantized latent representation, $\hat{q}$, may be decoded to reconstruct displacement maps, $\hat{f}_i$, and one or more blending coefficients, $\alpha_i$:

$$(\alpha_i, \hat{f}_i) = h_{\rho'}(\hat{q})$$

As an example, the decoder may be architecturally similar to the example encoder and include five blocks. Individual blocks may include upsampled convolutions (k may be about 5 and s may be about 2) and an inverse GDN layer. It should be appreciated that the presently disclosed technology allows for various encoders and decoders to be used that may be selected on a particular application. For example, reconstruction model 114 may be an autoencoder.

Optical flow model 116 may initially be untrained. Optical flow model 116 may take one or more reference frames and a target frame as input and output one or more displacement maps, which are described above. Optical flow model 116 may be trained using training content. A trained initial optical flow model may be a conditioned optical flow model. During training, weights may be fixed and independent uniform noise may be added, which may approximate the quantization operation performed in a bottleneck of optical flow model 116. The conditioned optical flow model may output more meaningful displacement maps (i.e., more accurately identifying motion data between the frames).

Optical flow model 116 may include an encoder and a decoder, similar to the ones described above for reconstruction model 114. In one example, optical flow model may be similar to the one described in U.S. patent application Ser. No. 16/261,441. Other existing optical flow models may also be used, such as, for example PWC-Net. Though not illustrated, it should be appreciated that communication media may be implemented in optical flow model 116 to transmit content from/to the encoder to/from the decoder.

Figure 2:
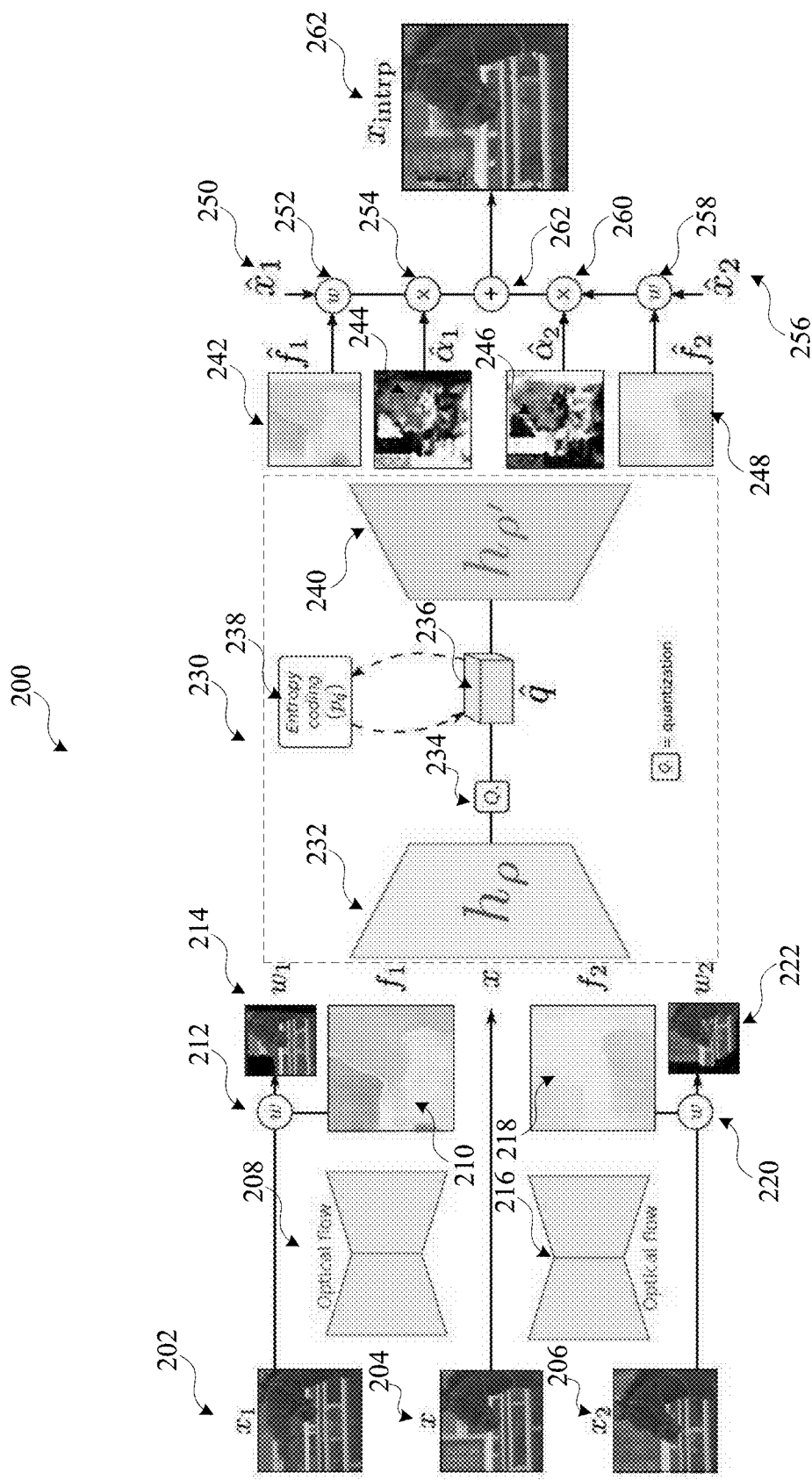
FIG. 2 illustrates an example pipeline used to reconstruct a frame, in accordance with embodiments of the disclosed technology.

In embodiments, reconstruction model 114 and optical flow model 116 may be used in a pipeline to generate a reconstructed target frame. FIG. 2 illustrates an example pipeline used to reconstruct a frame, in accordance with embodiments of the disclosed technology. Pipeline 200 may be used to predict, or reconstruct, a target frame using one or more reference frames and the target frame. Pipeline 200 may combine encoding of motion data and performing motion compensation. As will be described in greater detail herein, motion compensation in pixel space via temporal prediction based on one or more displacement maps may increase decoding efficiency and reconstruction quality by encoding side information into a latent representation that directly decodes the latent representation into one or more reconstructed displacement maps and one or more blending coefficients. Pipeline 200 may significantly improve rate distortion performance compared to existing methods that independently code motion data and subsequently perform motion compensation.

Frame 202 may represent a first reference frame. As illustrated, a horse may be running at a race track along a railing. Frame 204 may represent a target frame, or the frame to be reconstructed. As illustrated, frame 204 may be a subsequent frame to frame 202, where the horse is further left in the picture and there is a lit-up board. Frame 206 may represent a second reference frame. As illustrated, frame 206 may be a subsequent frame to frame 204, where the horse is even further left than in frame 204 and more of the lit-up board is shown.

Frames 202 and 204 may be input into model 208, which may represent an optical flow model, as described above. Model 208 may output map 210, which may represent a first displacement map. Frame 202 may be warped at 212 with map 210 to generate a first warped frame 214. Warping may include distorting a frame based on the motion data from a displacement map. For example, a displacement map may indicate a forward movement of one or more objects from a first frame to a second frame using vectors. Warping the first frame based on the displacement map may "move" the one or more objects in the first frame forward and crop, or otherwise leave empty, portions of the warped frame. As illustrated in frame 214, which may represent a first warped frame based on frame 202 and map 210, the horse and railing are moved forward (e.g., to the left) from frame 202. The top left portion of the first warped frame is blank, in this case black, to account for the lit-up scoreboard that appears in frame 204. Similarly, frames 204 and 206 may be input into model 216, which may be the same as model 208. Model 216 may output map 218, which may represent a second displacement map. Frame 206 may be warped at 220 with map 218 to generate a second warped frame 222.

Frame 204, map 210, first warped frame 214, map 218, and second warped frame 222 may be input into model 230. Model 230 may represent a conditioned reconstruction model, as described herein. Model 230 may include an encoder, 232, a quantization step, 234, a latent space, 236, an entropy coder, 238, and a decoder, 240. These components may be substantially similar to those described above.

Model 230 may output map 242, which may represent a first reconstructed map corresponding to map 210, blending coefficient 244 to be applied to frame 250, which may represent a first reconstructed reference frame, blending coefficient 246 to be applied to frame 256, which may represent a second reconstructed reference frame, and map 248, which may represent a second reconstructed map corresponding to map 218.

Frame 250 may be warped at 252 with map 242 to generate a warped frame that is weighted, or multiplied, by blending coefficient 244 at 254. Frame 256 may be warped at 258 with map 248 to generate a warped frame that is weighted, or multiplied, by blending coefficient 246 at 260. The first weighted warped frame corresponding to frame 250 and the second weighted warped frame corresponding to frame 256 may be combined to generate a reconstructed target frame, frame 262. Blending coefficients 244 and 246 may indicate which pixels to use from each warped frame to generate reconstructed target frame 262. For example, reconstructed target frame 262 may be based on $$x_{recon} = \sum_{i=1}^{n} \hat{\alpha}_i w(x_i, \hat{f}_i) \text{ with } \sum_{i}^{n} \hat{\alpha}_i = 1$$

where $x_{recon}$ may represent the reconstructed target frame, $\hat{\alpha}_i$ may represent the one or more blending coefficients, w may represent a warping function, $x_i$ may represent the one or more reconstructed reference frames, and $\hat{f}_i$ may represent the one or more reconstructed displacement maps.

Referring back to FIG. 1, electronic device 102 may include a variety of electronic computing devices, such as, for example, a smartphone, tablet, laptop, computer, wearable device, television, virtual reality device, augmented reality device, displays, connected home device, Internet of Things (IOT) device, smart speaker, and/or other devices. Electronic device 102 may present content to a user and/or receive requests to send content to another user. In some embodiments, electronic device 102 may apply reconstruction model 114 and/or optical flow model 116 to target content. In embodiments, electronic device 102 may store reconstruction model 114 and/or optical flow model 116.

As shown in FIG. 1, environment 100 may include one or more of electronic device 102 and server system 106. Electronic device 102 can be coupled to server system 106 via communication media 104. As will be described in detail herein, electronic device 102 and/or server system 106 may exchange communications signals, including content, metadata, quality levels, quantization step sizes, user input, encoders, decoders, latent space representations, displacement maps, warped frames, reference frames, reconstructed frames, entropy coders, blending coefficients, security and encryption information, and/or other information via communication media 104.

In various embodiments, communication media 104 may be based on one or more wireless communication protocols such as Wi-Fi, Bluetooth®, ZigBee, 802.11 protocols, Infrared (IR), Radio Frequency (RF), 2G, 3G, 4G, 5G, etc., and/or wired protocols and media. Communication media 104 may be implemented as a single medium in some cases.

As mentioned above, communication media 104 may be used to connect or communicatively couple electronic device 102 and/or server system 106 to one another or to a network, and communication media 104 may be implemented in a variety of forms. For example, communication media 104 may include an Internet connection, such as a local area network (LAN), a wide area network (WAN), a fiber optic network, internet over power lines, a hard-wired connection (e.g., a bus), and the like, or any other kind of network connection. Communication media 104 may be implemented using any combination of routers, cables, modems, switches, fiber optics, wires, radio (e.g., microwave/RF links), and the like. Upon reading the present disclosure, it should be appreciated that other ways may be used to implement communication media 104 for communications purposes.

Likewise, it will be appreciated that a similar communication medium may be used to connect or communicatively couple server 108, storage 110, processor 112, reconstruction model 114, and/or optical flow model 116 to one another in addition to other elements of environment 100. In example implementations, communication media 104 may be, or include, a wired or wireless wide area network (e.g., cellular, fiber, and/or circuit-switched connection, etc.) for electronic device 102 and/or server system 106, which may be relatively geographically disparate; and in some cases, aspects of communication media 104 may involve a wired or wireless local area network (e.g., Wi-Fi, Bluetooth, unlicensed wireless connection, USB, HDMI, standard AV, etc.), which may be used to communicatively couple aspects of environment 100 that may be relatively close geographically.

Server system 106 may provide, receive, collect, or monitor information to/from electronic device 102, such as, for example, content, metadata, quality levels, quantization step sizes, user input, encoders, decoders, latent space representations, displacement maps, warped frames, reference frames, reconstructed frames, entropy coders, blending coefficients, security and encryption information, and the like. Server system 106 may be configured to receive or send such information via communication media 104. This information may be stored in storage 110 and may be processed using processor 112. For example, processor 112 may include an analytics engine capable of performing analytics on information that server system 106 has collected, received, etc. from electronic device 102. Processor 112 may include reconstruction model 114 and/or optical flow model 116 capable of receiving target content, analyzing target content, compressing target content, encoding target content, quantizing target content, convolving target content, deconvolving target content, decoding target content, decompressing target content, generating displacement maps, and otherwise processing content and reconstructing a frame that server system 106 has collected, received, etc. based on requests from, or coming from, electronic device 102. In embodiments, server 108, storage 110, and/or processor 112 may be implemented as a distributed computing network, a relational database, or the like.

Server 108 may include, for example, an Internet server, a router, a desktop or laptop computer, a smartphone, a tablet, a processor, a component, or the like, and may be implemented in various forms, including, for example, in an integrated circuit or collection thereof, in a printed circuit board or collection thereof, or in a discrete housing/package/rack or multiple of the same. Server 108 may update information stored on electronic device 102. Server 108 may send/receive information to/from electronic device 102 in real-time or sporadically. Further, server 108 may implement cloud computing capabilities for electronic device 102. Upon studying the present disclosure, one of skill in the art will appreciate that environment 100 may include multiple electronic devices 102, communication media 104, server systems 106, servers 108, storage 110, processors 112, reconstruction models 114, and/or optical flow models 116.

Figure 3:
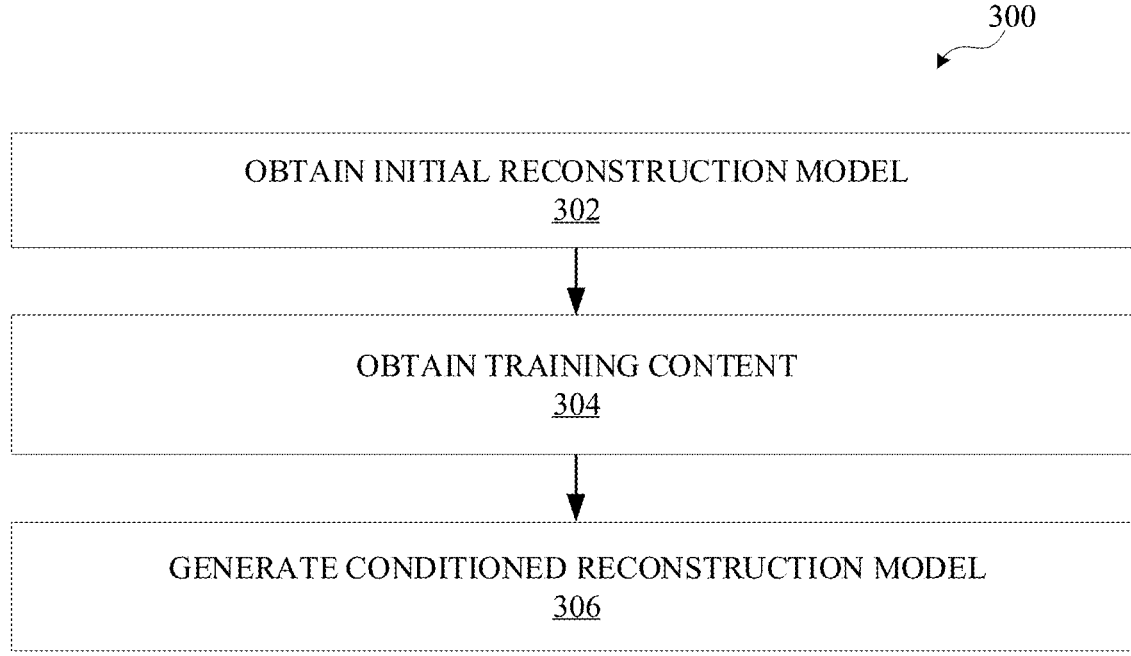
FIG. 3 is an operational flow diagram illustrating an example process for reconstructing a frame, in accordance with one embodiment.

FIG. 3 is an operational flow diagram illustrating an example process for training a reconstruction model, in accordance with one embodiment. The operations of the various methods described herein are not necessarily limited to the order described or shown in the figures, and it should be appreciated, upon studying the present disclosure, that variations of the order of the operations described herein are within the spirit and scope of the disclosure.

The operations and sub-operations of the flow diagrams may be carried out, in some cases, by one or more of the components, elements, devices, components, and circuitry of system 100. This may include one or more of: server system 106; server 108; processor 112; storage 110; reconstruction model 114; optical flow model 116; and/or computing component 700, described herein and referenced with respect to at least FIGS. 1 and 7, as well as subcomponents, elements, devices, components, and circuitry depicted therein and/or described with respect thereto. In such instances, the description of the flow diagrams may refer to a corresponding component, element, etc., but regardless of whether an explicit reference is made, it will be appreciated, upon studying the present disclosure, when the corresponding component, element, etc. may be used. Further, it will be appreciated that such references do not necessarily limit the described methods to the particular component, element, etc. referred to. Thus, it will be appreciated that aspects and features described above in connection with (sub-) components, elements, devices, circuitry, etc., including variations thereof, may be applied to the various operations described in connection with the flow diagram without departing from the scope of the present disclosure.

At operation 302, an initial reconstruction model may be obtained. The initial reconstruction model may include an encoder and a decoder, as described above. The encoder may receive as input a target frame, one or more displacement maps, and one or more corresponding warped frames. The decoder may output one or more blending coefficients and reconstructed displacement frames.

At operation 304, training content may be obtained. The training content may be substantially similar to that described above.

At operation 306, a conditioned reconstruction model may be generated. The conditioned reconstruction model may be generated by applying the training content to the initial reconstruction model. The conditioned reconstruction model may have been trained based on the one or more reconstruction parameters. For example, rate-distortion may be balanced against size of the encoded, or compressed, data.

Figure 4:
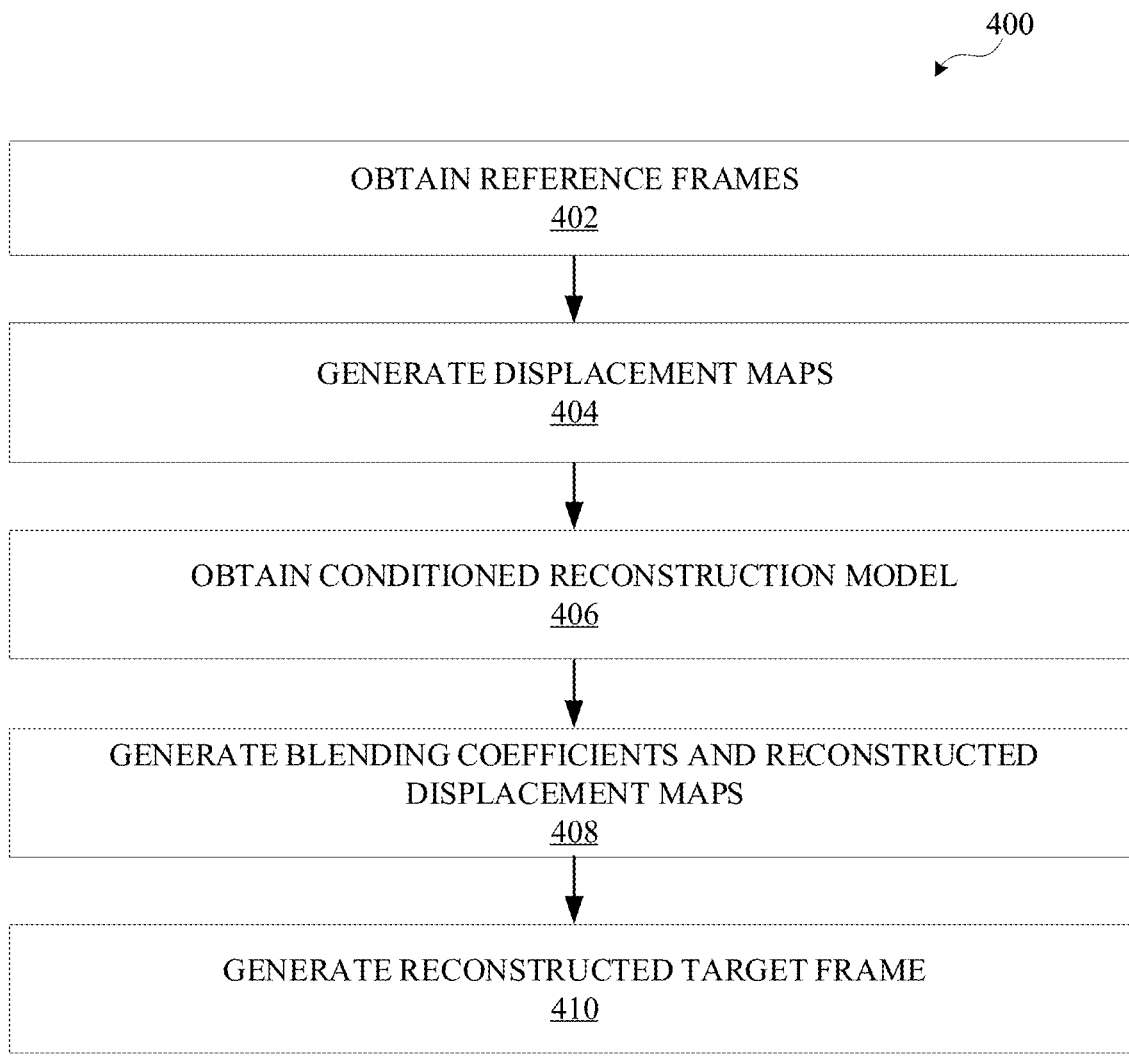
FIG. 4 is an operational flow diagram illustrating an example process for reconstructing a frame, in accordance with one embodiment.

FIG. 4 is an operational flow diagram illustrating an example process for reconstructing a frame, in accordance with one embodiment. At operation 402, one or more reference frames may be obtained. The one or more reference frames may be substantially similar to those described above. In some embodiments, the one or more reference frames may be reconstructed target frames.

At operation 404, one or more displacement maps may be generated. In some embodiments, a target frame may be obtained. In embodiments, the target frame may be a reconstructed target frame. The one or more displacement maps may be generated by exploiting redundant information in consecutive frames and/or using motion data extracted by comparing a reference frame to a target frame. The one or more displacement maps may be substantially similar to those described above.

At operation 406, a conditioned reconstruction model may be obtained. The conditioned reconstruction model may be generated by training an initial reconstruction model, as described above.

At operation 408, one or more blending coefficients and one or more reconstructed displacement maps may be generated. The one or more blending coefficients and the one or more reconstructed displacement maps may be generated by applying the target frame the one or more corresponding displacement maps, and the one or more corresponding warped frames to the conditioned reconstruction model, as described above.

At operation 410, a reconstructed target frame may be generated. In some embodiments, reconstructed reference frames may be obtained. These may be generated by using the reconstruction model described above, other decoders, and/or other existing models. The reconstructed reference frames may be used with the one or more corresponding reconstructed displacement maps to generate one or more reconstructed warped frames. The one or more reconstructed warped frames may be weighted by the one or more blending coefficients (e.g., on a pixel by pixel basis). The one or more weighted reconstructed warped frames may be combined to generate the reconstructed target frame. The one or more weighted reconstructed reference frames may be combined based on the one or more blending coefficients, indicating which pixels to keep from each of the weighted reconstruction frames, to the extent there are multiple weighted reconstruction frames.

Figure 5:
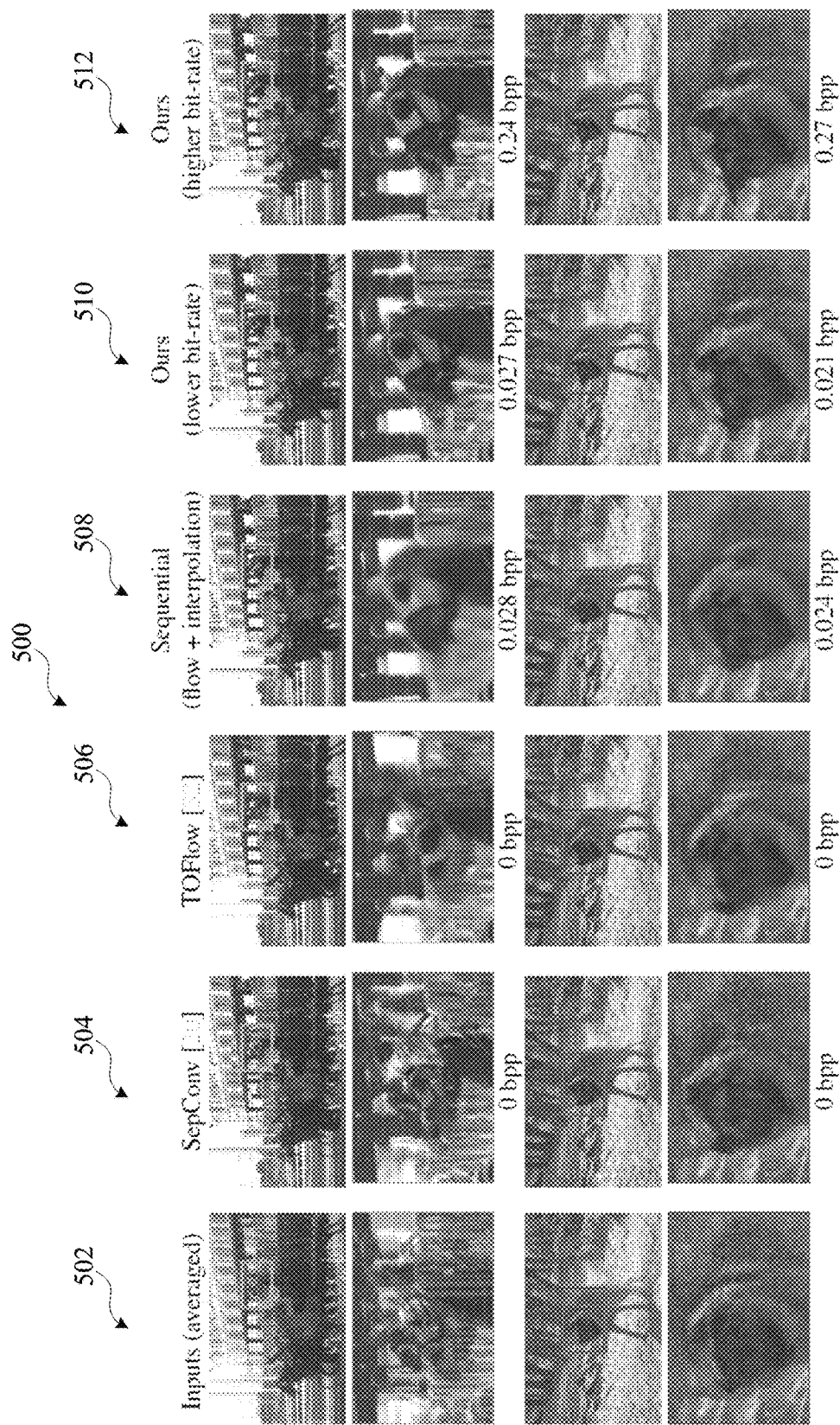
FIG. 5 illustrates example target frames and corresponding reconstructed target frames, in accordance with one embodiment.

FIG. 5 illustrates example target frames and corresponding reconstructed target frames, in accordance with one embodiment. Column 502 illustrates two target frames, where individual frames include an average of the input frames. The reference frames may be both before and after a selected target frame. Column 504 illustrates applying the input frames to an existing frame reconstruction network, which does not transfer motion data, in order to attempt to reconstruct the frames. As illustrated, the frames of column 504 are blurry and do not distinguish the objects in the frame very well. Column 506 illustrates applying the input frames to an existing frame reconstruction network, which also does not transfer motion data, in order to attempt to reconstruct the frames. As illustrated, the frames of column 504 are even more blurry. Column 508 illustrates first decompressing the displacement maps, then attempting to reconstruct the frame. While the frames in column 508 are less blurry, it is still a poor reconstruction compared to columns 510 and 512. Column 510 illustrates applying the input frames of column 502 to the presently disclosed technology at a lower bit-rate. The frames of column 510 are much clearer than columns 502, 504, 506, and 508. It is clear that the upper frame is of a horse and the features of the dog are more distinguishable than frames from columns 502, 504, 506, and 508. Column 512 illustrates applying the input frames of column 502 to the presently disclosed technology at a higher bit-rate than used for column 510. The frames of column 512 are much clearer than the frames of columns 502, 504, 506, and 508, and even a bit clearer than the frames in column 510. Features of the horse's head are even more distinguishable in column 512 than in column 510 and the features of the dog are more distinguishable than any of the other frames. It should be noted that the networks and methods used in column 504, 506, and 508 require more computation power at decoding time yet still perform worse than the presently disclosed technology.

Figure 6:
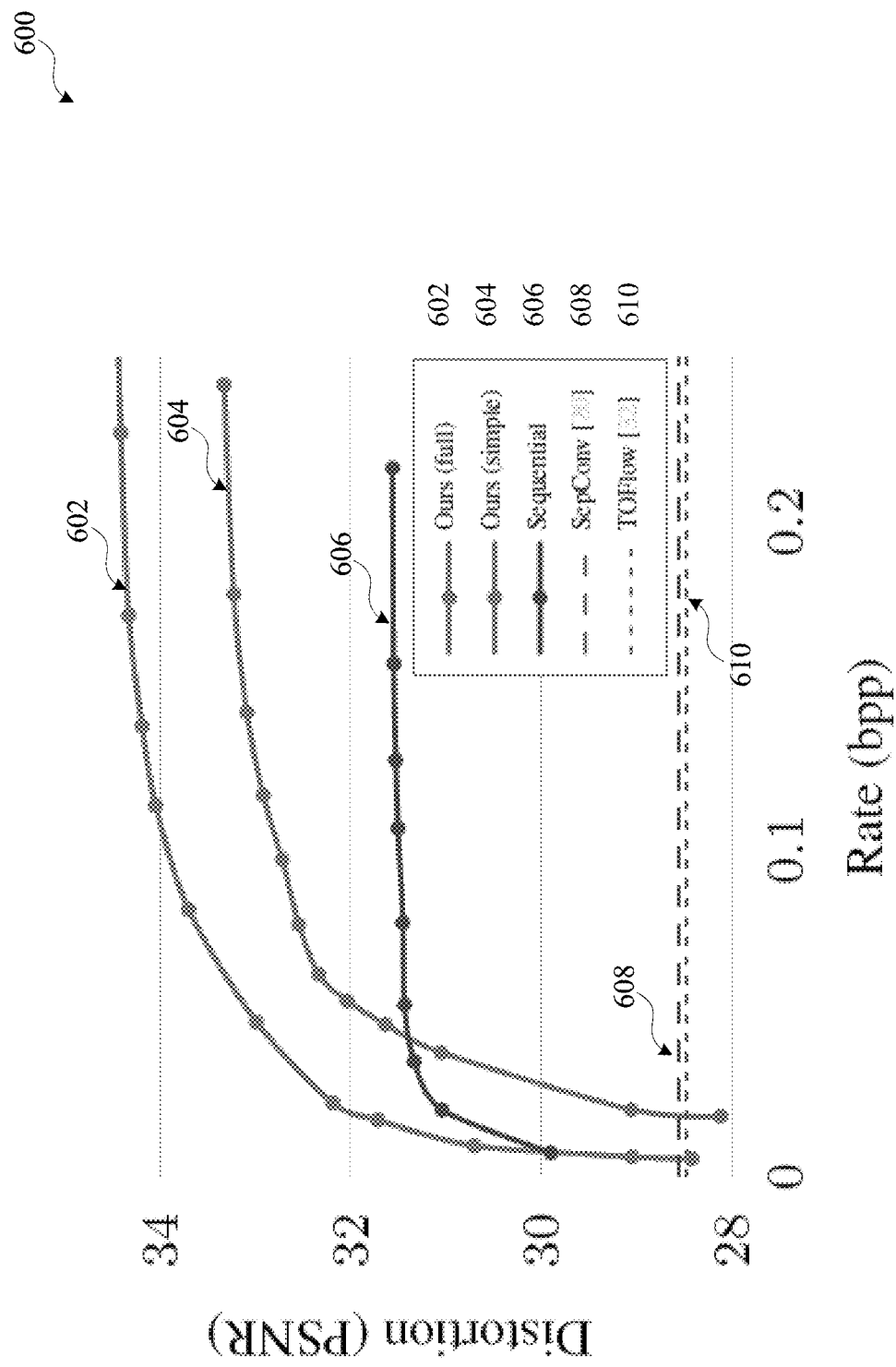
FIG. 6 illustrates example rate distortion curves, in accordance with one embodiment.

FIG. 6 illustrates example rate distortion curves, in accordance with one embodiment. Line 602 represents a rate distortion curve for a first model, while line 604 represents a rate distortion curve for a second model, wherein the first model uses a different, more complex probability distribution function than the second model. As illustrated, the highest signal to noise ratio at the highest bit-rates is achieved by the first model of the presently disclosed technology, represented by line 602. The next highest signal to noise ratio at the highest bit-rates is achieved by a second model of the presently disclosed technology, represented by line 604. Line 604 represents a rate distortion curve for a sequential model, which requires first decompressing the displacement maps, then attempting to reconstruct the frame. The sequential model provides significantly lower quality based on bit-rate. Lines 608 and 610 are fairly similar, and they represent existing networks that do not anticipate transferring motion data. They provide similar quality distortion regardless of bit-rate.

The presently disclosed technology may exploit the use of the one or more warped frames and the target frame being available at encoding to better predict blending coefficients. In addition, while distortion on the reconstructed target frame may be penalized, distortion on the motion data may not be penalized with respect to the one or more reconstruction parameters. As a result, motion may be treated as auxiliary information that enables the presently disclosed technology to identify the importance of motion data and to infer where individual portions of a frame are unnecessary, or less important, with respect to the reconstructed target frame. The presently disclosed technology also reduces computation time and resources in decoding the relevant data.

Figure 7:
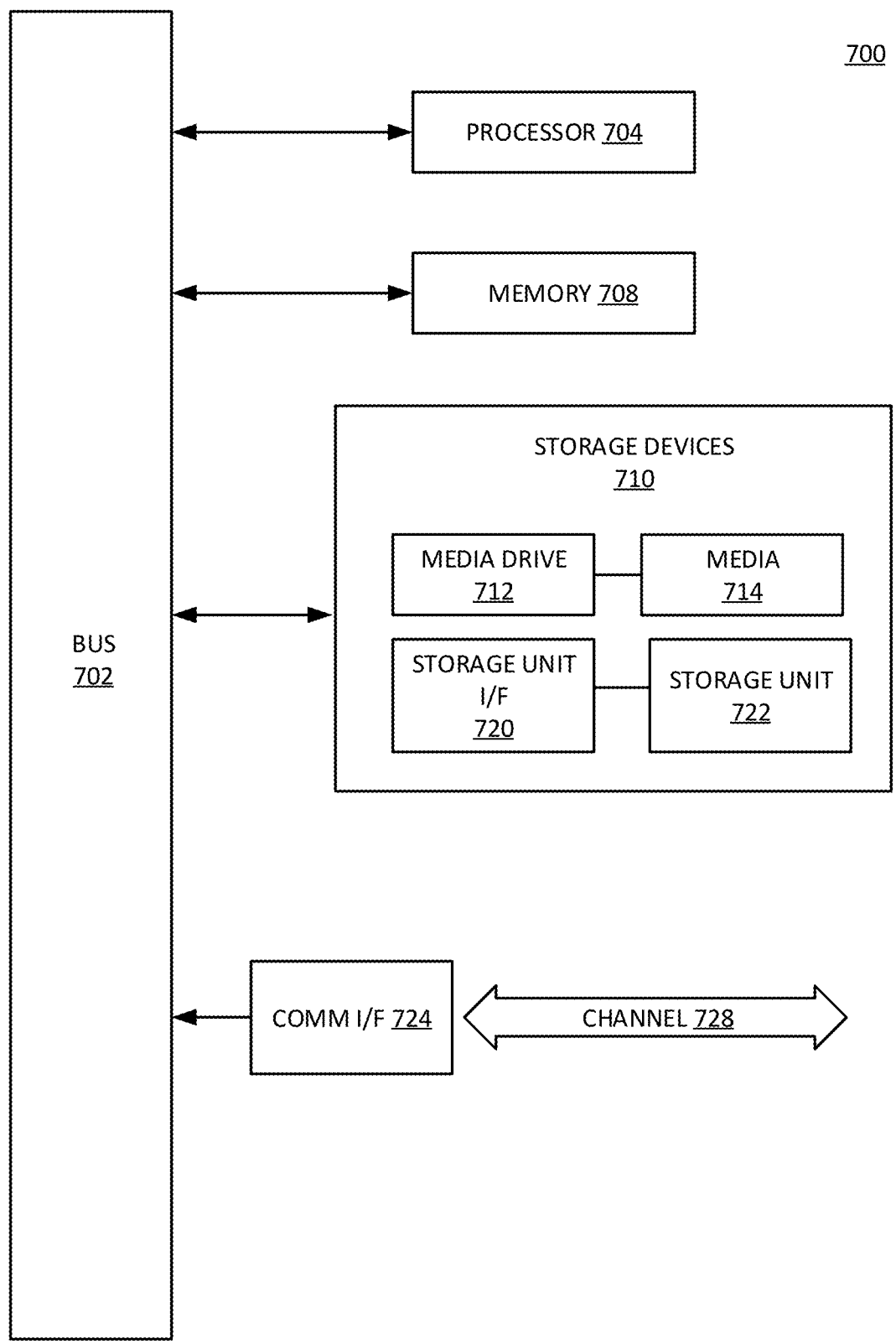
FIG. 7 illustrates an example computing component that may be used to implement features of various embodiments of the disclosure.

As used herein, the term component might describe a given unit of functionality that can be performed in accordance with one or more embodiments of the technology disclosed herein. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. As used herein, the term engine may describe a collection of components configured to perform one or more specific tasks. Even though various features or elements of functionality may be individually described or claimed as separate components or engines, one of ordinary skill in the art will understand that these features and functionality can be shared among one or more common software and hardware elements, and such description shall not require or imply that separate hardware or software components are used to implement such features or functionality.

Where engines and/or components of the technology are implemented in whole or in part using software, in one embodiment, these software elements can be implemented to operate with a computing or processing component capable of carrying out the functionality described with respect thereto. One such example computing component is shown in FIG. 7. Various embodiments are described in terms of this example-computing component 700. After reading this description, it should be appreciated how to implement the technology using other computing components or architectures.

Referring now to FIG. 7, computing component 700 may represent, for example, computing or processing capabilities found within desktop, laptop, and notebook computers; hand-held computing devices (PDA's, smart phones, cell phones, palmtops, etc.); mainframes, supercomputers, workstations, or servers; or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, digital cameras, navigation systems, cellular telephones, portable computing devices, modems, routers, WAPs, terminals and other electronic devices that might include some form of processing capability.

Computing component 700 might include, for example, one or more processors, controllers, control components, or other processing devices, such as a processor 704. Processor 704 might be implemented using a general-purpose or special-purpose processing engine such as, for example, a physical computer processor, microprocessor, controller, or other control logic. In the illustrated example, processor 704 is connected to a bus 702, although any communication medium can be used to facilitate interaction with other components of computing component 700 or to communicate externally.

Computing component 700 might also include one or more memory components, simply referred to herein as main memory 708. For example, random access memory (RAM) or other dynamic memory might be used for storing information and instructions to be executed by processor 704. Main memory 708 might also be used for storing temporary variables or other intermediate information during execution of instructions to be executed by processor 704. Computing component 700 might likewise include a read-only memory ("ROM") or other static storage device coupled to bus 702 for storing static information and instructions for processor 704.

The computing component 700 might also include one or more various forms of information storage device 710, which might include, for example, a media drive 712 and a storage unit interface 720. The media drive 712 might include a drive or other mechanism to support fixed or removable storage media 77. For example, a hard disk drive, a floppy disk drive, a magnetic tape drive, an optical disk drive, a CD or DVD drive (R or RW), or other removable or fixed media drive might be provided. Accordingly, storage media 77 might include, for example, non-transient electronic storage, a hard disk, a floppy disk, magnetic tape, cartridge, optical disk, a CD or DVD, or other fixed or removable medium that is read by, written to, or accessed by media drive 712. As these examples illustrate, the storage media 77 can include a computer usable storage medium having stored therein computer software or data.

In alternative embodiments, information storage mechanism 710 might include other similar instrumentalities for allowing computer programs or other instructions or data to be loaded into computing component 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory component) and memory slot, a PCMCIA slot and card, and other fixed or removable storage units 722 and interfaces 720 that allow software and data to be transferred from the storage unit 722 to computing component 700.

Computing component 700 might also include a communications interface 724. Communications interface 724 might be used to allow software and data to be transferred between computing component 700 and external devices. Examples of communications interface 724 might include a modem or softmodem, a network interface (such as an Ethernet, network interface card, WiMedia, IEEE 802.XX, or other interface), a communications port (such as for example, a USB port, IR port, RS232 port, Bluetooth® interface, or other port), or other communications interface. Software and data transferred via communications interface 724 might typically be carried on signals, which can be electronic, electromagnetic (which includes optical), or other signals capable of being exchanged by a given communications interface 724. These signals might be provided to communications interface 724 via channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 708, storage unit 720, media 77, and channel 728. These and other various forms of computer program media or computer usable media may be involved in carrying one or more sequences of one or more instructions to a processing device for execution. Such instructions embodied on the medium are generally referred to as "computer program code" or a "computer program product" (which may be grouped in the form of computer programs or other groupings). When executed, such instructions might enable the computing component 700 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning, and configurations can be implemented to implement the desired features of the technology disclosed herein. Also, a multitude of different constituent component names other than those depicted herein can be applied to the various partitions. Additionally, with regard to flow diagrams, operational descriptions, and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to," or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts, and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method comprising:
   generating, using an optical flow model, one or more displacement maps based on one or more reference frames and a target frame;
   generating one or more warped frames based on the one or more reference frames and the one or more displacement maps;
   generating a conditioned reconstruction model by training an initial reconstruction model using training content and one or more reconstruction parameters, wherein the training content comprising a training target frame and one or more training reference frames, and wherein the conditioned reconstruction model optimizes for the one or more reconstruction parameters; and generating, using the conditioned reconstruction model, one or more blending coefficients and one or more reconstructed displacement maps based on the one or more displacement maps, the one or more warped frames, and the target frame.

2. The computer-implemented method of claim 1, further comprising generating a reconstructed target frame using one or more reconstructed reference frames, the one or more blending coefficients, and the one or more reconstructed displacement maps.

3. The computer-implemented method of claim 2, wherein of the one or more blending coefficients indicate which pixels to use from of the one or more reconstructed reference frames.

4. The computer-implemented method of claim 1, wherein of the one or more reference frames comprise reconstructed target frames.

5. The computer-implemented method of claim 1, wherein of the one or more reference frames are separated from the target frame by an interval.

6. The computer-implemented method of claim 5, wherein the interval is between one frame and five frames.

7. The computer-implemented method of claim 1, wherein the one or more displacement maps represent motion data based on a difference between the target frame and of the one or more reference frames.

8. The computer-implemented method of claim 1, wherein of the one or more warped frames are generated by applying of the one or more displacement maps to the one or more reference frames.

9. A computer-implemented method comprising:

obtaining training content, wherein the training content comprises a training target frame and one or more training reference frames, wherein the training target frame and the one or more training reference frames are used to generate one or more corresponding training displacement maps and one or more corresponding training warped frames; and generating a conditioned reconstruction model by training an initial reconstruction model using the training content and one or more reconstruction parameters, wherein the conditioned reconstruction model optimizes for the one or more reconstruction parameters.

10. The computer-implemented method of claim 9, further comprising:

generating, using an optical flow model, one or more displacement maps based on one or more reference frames and a target frame;

generating one or more warped frames based on the one or more reference frames and the one or more displacement maps; and generating, using the conditioned reconstruction model, one or more blending coefficients and one or more reconstructed displacement maps based on the one or more displacement maps, the one or more warped frames, and the target frame.

11. The computer-implemented method of claim 10, further comprising:

generating a reconstructed target frame using one or more reconstructed reference frames, the one or more blending coefficients, and the one or more reconstructed displacement maps.

12. The computer-implemented method of claim 11, wherein the one or more blending coefficients indicate which pixels to use from the one or more reconstructed reference frames.

13. The computer-implemented method of claim 10, wherein the one or more displacement maps represent motion data based on a difference between the target frame the one or more reference frames.

14. A system comprising:

a memory storing one or more instructions; and one or more processors that execute the one or more instructions to perform the steps of:

generating a conditioned reconstruction model by training an initial reconstruction model using training content and one or more reconstruction parameters, the training content comprising a training target frame and one or more target reference frames, wherein the conditioned reconstruction model optimizes for the one or more reconstruction parameters; and generating, using the conditioned reconstruction model, one or more blending coefficients and one or more reconstructed displacement maps by applying target content to the conditioned reconstruction model.

15. The system of claim 14, wherein the one or more processors are further configured to perform the steps of:

generating a reconstructed target frame using one or more reconstructed reference frames, the one or more blending coefficients, and the one or more reconstructed displacement maps.

16. The system of claim 15, wherein the one or more blending coefficients indicate which pixels to use from the one or more reconstructed reference frames.

17. The system of claim 14, wherein the target content comprises a target frame, one or more displacement maps, and one or more corresponding warped frames.

18. The system of claim 17, wherein the one or more displacement maps represent motion data based on a difference between the target frame and one or more reference frames.

19. The system of claim 17, wherein one or more reference frames are separated from the target frame by one or more intervals.

20. The system of claim 17, wherein the one or more corresponding warped frames are generated by applying the one or more displacement maps to the target frame.

* * * * *

UNITED STATES PATENT AND TRADEMARK OFFICE
CERTIFICATE OF CORRECTION

PATENT NO. : 10,972,749 B2  
APPLICATION NO. : 16/556083  
DATED : April 6, 2021  
INVENTOR(S) : Schroers et al.

Page 1 of 1

It is certified that error appears in the above-identified patent and that said Letters Patent is hereby corrected as shown below:

In the Claims

Column 17, Claim 3, Line 16, please delete "of";

Column 17, Claim 3, Line 17, please delete "of";

Column 17, Claim 4, Line 20, please delete "of";

Column 17, Claim 5, Line 23, please delete "of";

Column 17, Claim 7, Line 30, please delete "of";

Column 17, Claim 8, Line 32, please delete "of";

Column 17, Claim 8, Line 33, please delete "of".

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*